(12) United States Patent
Berno

(10) Patent No.: US 6,694,321 B1
(45) Date of Patent: Feb. 17, 2004

(54) SYSTEM, METHOD, AND PRODUCT FOR DEVELOPMENT AND MAINTENANCE OF DATABASE-RELATED SOFTWARE APPLICATIONS

(75) Inventor: Anthony J. Berno, San Jose, CA (US)

(73) Assignee: Affymetrix, Inc., Santa Clara, CA (US)

( * ) Notice: Subject to any disclaimer, the term of this patent is extended or adjusted under 35 U.S.C. 154(b) by 158 days.

(21) Appl. No.: 09/668,118

(22) Filed: Sep. 22, 2000

Related U.S. Application Data

(60) Provisional application No. 60/155,715, filed on Sep. 23, 1999.

(51) Int. Cl.⁷ .............................................. G06F 17/30
(52) U.S. Cl. .................................... 707/101; 707/104.1
(58) Field of Search ................................ 707/1, 2, 3, 4, 707/10, 100, 101, 102; 709/217, 229, 11

(56) References Cited

U.S. PATENT DOCUMENTS

| | | | |
|---|---|---|---|
| 6,009,428 A | * 12/1999 | Kleewein et al. | 707/10 |
| 6,122,627 A | * 9/2000 | Carey et al. | 707/4 |
| 6,134,540 A | * 10/2000 | Carey et al. | 707/2 |
| 6,226,637 B1 | * 5/2001 | Carey et al. | 707/4 |
| 6,236,997 B1 | * 5/2001 | Bodamer et al. | 707/10 |
| 6,356,913 B1 | * 3/2002 | Chu et al. | 707/102 |
| 6,366,917 B1 | * 4/2002 | St. John Herbert, III | 707/100 |

OTHER PUBLICATIONS

M.T. Roth and P. Schwarz. Don't Scrap It, Wrap It! A Wrapper Architecture for Legacy Data Sources. In 23rd VLDB Conf., Athens, Greece, 1997.*

Tom Portfolio, PL/SQL User's Guide and Reference, Release 8.1.5, Part No. A67842–01, 478 pages, Copyright 1999, Oracle Corp.; downloaded from http://www.cs.montana.edu/~admin/oradoc/server.815/a67842/toc.htm on Sep. 24, 2001.

Young–Gook Ra and Elke A. Rundensteiner, A Transparent Object–Oriented Scheme Change Approach Using View Evolution, 36 pages, Software Systems Research Laboratory, Dept. of Electrical Engineering and Computer Science, The University of Michigan, Ann Arbor, MI 48109–2122, Apr., 1994.

Introduction to WebSphere Application Server, 87 pages, Copyright IBM Corporation 1999 downloaded from http://www.transarc.ibm.com/Library/documentation/websphere/appserv35/atswig/atswig02.htm on Sep. 24, 2001.

(List continued on next page.)

Primary Examiner—Diane D. Mizrahi
Assistant Examiner—Yicun Wu
(74) Attorney, Agent, or Firm—Alan B. Sherr; John R. Merkling; Wei Zhou

(57) ABSTRACT

A schema-isolated system is disclosed for developing, modifying, or maintaining client applications that accesses target databases. The system includes a middleware-table inserter that inserts middleware tables into the target database. The middleware tables include a set of compatibility data relating one or more client-application data requests with one or more corresponding target-database data capabilities. The middleware tables also include a data communication component. This component receives a client-application data request from the client application, and, based on at least a first datum of the set of compatibility data, provides to the client application the one or more target-database data capabilities corresponding to the client-application data request. The first compatibility datum relates the one or more client-application data requests with the one or more corresponding target-database data capabilities based, at least in part, on an application-usage-independent criterion. An application-usage-independent criterion may be a syntax criterion, a configuration criterion, or a component-usage criterion. The first compatibility datum may include at least one SQL query. The at least one target database may be a relational database.

21 Claims, 7 Drawing Sheets

OTHER PUBLICATIONS

CORBA (The Common Object Request Broker Architecture) Frequently Asked Questions, 7 pages, Object Management Group introduced CORBA 1.1 in 1991 and 2.0 in 1994, downloaded from http://www.corba.ch/e/faq.html on Sep. 24, 2001.

MapX downloaded from http://testdrive.mapinfo.com/mapxhelp/MapX.htm on Sep. 24, 2001.

* cited by examiner

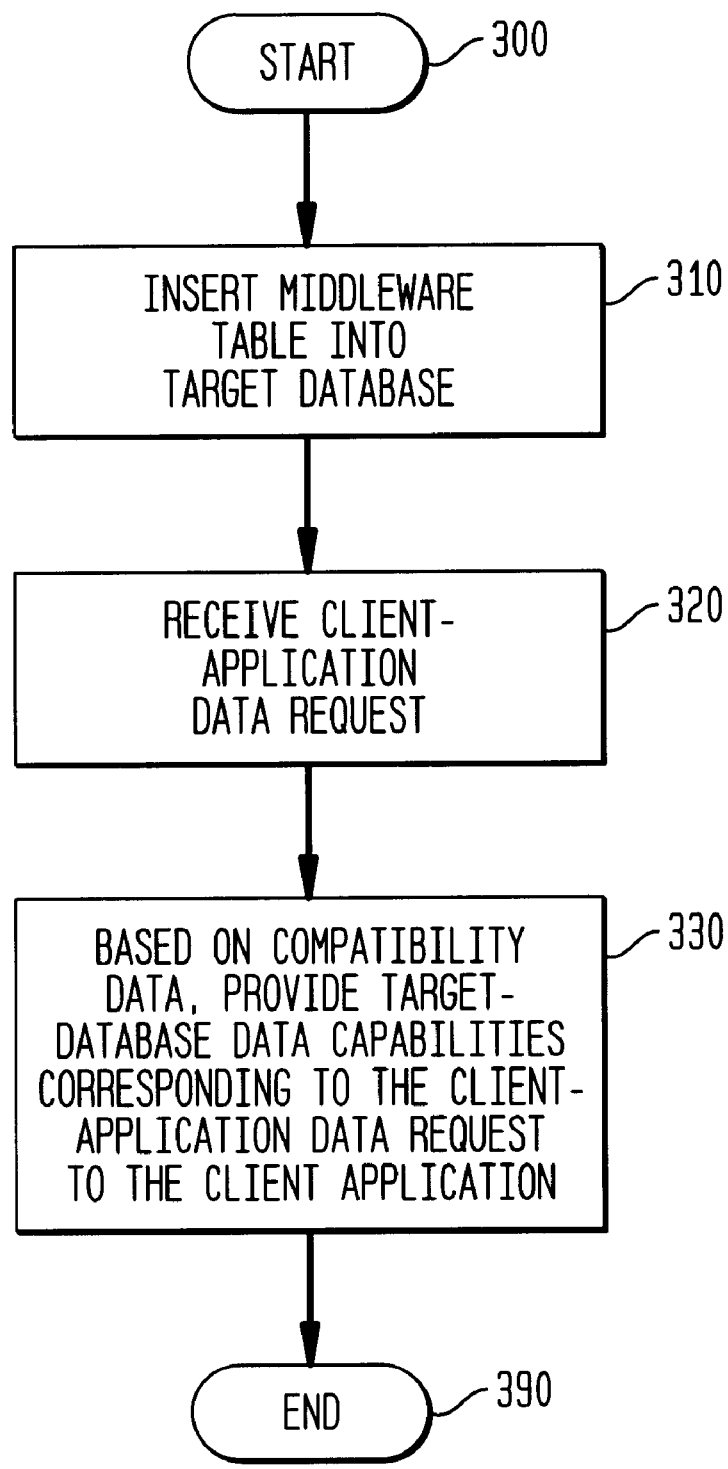

SYSTEM, METHOD, AND PRODUCT FOR DEVELOPMENT AND MAINTENANCE OF DATABASE-RELATED SOFTWARE APPLICATIONS

RELATED APPLICATION

The present application claims priority from U.S. Provisional Application No. 60/155,715, filed Sep. 23, 1999, entitled "Pantheon Data Access Architecture," the contents of which are hereby incorporated herein in their entirety by reference.

BACKGROUND

1. Field of the Invention

The present invention relates generally to methods and systems for accessing data in databases and, more particularly, to systems, methods, software products, and software product components used to develop software applications that access data in relational databases.

2. Related Art

The development and maintenance of client-server software systems can become extremely difficult when client software applications that access a database are dependent on the database schema. As the number of client applications increases, the amount of work required to implement a change of schema increases dramatically. Not only do all the affected client applications have to be changed, but it generally also is necessary to track all the dependencies between clients and the database so as to ensure that all the required changes are accounted for. Moreover, once the schema change is complete, it typically is necessary to recompile and redistribute all the affected client applications. As the number of client applications increases, these tasks can become complex and burdensome.

A variety of approaches have been developed for isolating client applications from the database schema so that certain types of schema changes can be made without requiring that the client applications be revised. For instance, some commercially available database products include user interfaces that implement a technique sometimes referred to as "data binding." Data binding involves the use of SQL (Structured Query Language) commands to declaratively map server-side data into the user interface software component without requiring that the programmer manage details of the operation of the user interface component. Data binding is popular because it is simple, easy to use, relatively standard, and can be used casually without requiring any support outside the user-interface component.

The use of data-binding interfaces suffers, however, from a number of disadvantages. One is that result sets generally must be updateable, which may impose serious limitations on the design of the user interface component. Another disadvantage is that the SQL code responsible for the data binding generally is stored in the client application. Thus, when the data bindings are changed due to a change in the database scheme, the client application must be recompiled and redistributed. Moreover, many data-bound interface components employ a single SQL command to manage all of their operations, thereby significantly limiting functionality. Even if more than one SQL command is used, the functionality is limited by the scope of the SQL commands employed. Yet another disadvantage is that it typically is difficult to change the behavior of data-bound interface controls at runtime.

Another approach to isolating client applications from the database schema is to use views and stored procedures to map data and operations on the data from the client to the server, with applications accessing the database only through these objects. The views-and-stored-procedures approach generally offers the advantage over data-binding approaches of maintaining functionality on the server side. However, there are a number of disadvantages to the views-and-stored-procedures approach. For example, it typically is difficult to maintain stored procedures, as they contain no information about their intended use, or indeed, whether they are used at all. A typical database will soon become cluttered with unused code, creating a significant drain on maintenance efforts. Another disadvantage is that stored procedures and views generally are accessed by name, making naming problems likely as the number of clients increases or when clients are moved from one database to another. Moreover, all the available stored procedure names generally are not known in advance, and it typically is difficult for client applications to change their behavior at runtime without having this information available. Yet another disadvantage is that, unless regularly recompiled, it is possible for stored procedures to become invalid and therefore to fail without apparent explanation. Generally, the use of views also invites dependencies on the ability to update a view. This capability often cannot be guaranteed even as the result of seemingly minor schema changes.

Yet another approach has been used by database developers and has also been incorporated into commercial software products that often are referred to as "middleware." These products provide an object-oriented view of the database so that compatibility with the client applications is maintained even as the underlying database changes. Middleware addresses a number of the problems associated with data binding by re-mapping the database schema to an invariant, often object-oriented form. Also, some middleware products offer the additional features of transaction management and integration of multiple data sources. Moreover, some middleware systems provide a view of the database that reduces the mismatch between the relational data structures in a database and the pointer-based data structures most often used in programming languages. However, conventional middleware products also generally have significant disadvantages when used as a mechanism for schema independence. For example, the queries they employ often are cumbersome and difficult to maintain, requiring a relatively formal configuration management strategy. Due to the complexity of configuring the middleware to particular applications, they generally are very expensive, whether purchased commercially or developed in-house. In addition, some middleware products are tied to a specific language, such as Java or C++, thereby dictating how client applications must be developed.

SUMMARY

Systems, methods, and products are described for developing, modifying, or maintaining client applications that access data in one more databases. For convenience, these one or more databases may sometimes be referred to hereafter singly or in the aggregate as the "target database." The target database typically, but not necessarily, is a relational database. Systems in accordance with the present invention may hereafter be referred to for convenience as "schema-isolated systems." Reference may occasionally be made in the detailed description or the figures to a particular implementation of a schema-isolated system, arbitrarily referred to convenience as the "Pantheon" system or architecture. It will be understood that these reference although made simply to "systems" for convenience, generally include methods and products in accordance with the present invention.

Embodiments of the present invention provide various combinations of advantages over conventional systems, methods, or products for developing, modifying, or maintaining applications that access databases. With respect to conventional approaches using data-binding interfaces, for example, the SQL code responsible for the binding in accordance with some implementations of a schema-isolated system is stored in the target database, rather than in the client application. Thus, when the bindings are changed, there is no need to recompile and redistribute the client application. Also, schema-isolated system components may have an unrestricted number of query templates. Thus, they offer greater functionality as compared with approaches employing conventional data-binding interfaces. For instance, optional features may be provided that that the user need not employ. Similarly, a schema-isolated system typically employs templates that update data in the target database. The schema-isolated system thus can perform arbitrarily complex operations using procedural code. This capability generally is not possible with the pure SQL used by most data-bound controls. Yet another advantage is that, as noted, it typically is difficult to change the behavior of data-bound interface controls at runtime. In contrast, the multiple configurations available to a schema-isolated system component makes it easy to implement and coordinate runtime dynamism of this type.

Schema-isolated systems also provide important advantages as compared to middleware products. Contrary to the case with respect to middleware products, there are many strategies and languages that can be used to create a client application that is consistent with a schema-isolated system.

Advantages are also achieved as compared to the stored-procedure-and-views approaches noted above. For example, a schema-isolated system typically uses globally unique identifiers (GUIDs) to access objects that might suffer from namespace collisions. Also, schema-isolated system components typically do not use updateable result sets; rather, they perform updates using separate SQL commands. Further, schema-isolated system client applications may determine available configurations at runtime by interrogating tables inserted by the schema-isolated system into the target database. For convenience, these tables, as further described below, are generally referred to as "middleware tables." Another advantage is that schema-isolated system components compile their SQL code the first time it is executed in each session.

These and other advantages are realized by virtue of various attributes of the schema-isolated system, such as the organization of SQL queries in accordance with the following four criteria: syntax; configuration (also sometimes referred to as semantics); component usage; and application usage. In some implementations, "syntax" refers, for example, to the number, names, and types of columns in a tabular data set. In some implementations, "configuration" may refer to the intended function of a datum in what is referred to herein as compatibility data. By compatibility data is meant data relating one or more client-application data requests with one or more corresponding target-database data capabilities. The compatibility data may include an SQL query. As is well known in the art, there are numerous variations and procedural extensions of SQL, such as Transact-SQL, PL/SQL, and others. The term "component usage" is used herein to refer to the ability of a component to make use of a compatibility datum. For convenience, the criteria of syntax, configuration, and component usage may sometimes generally and collectively be referred to herein as "application-usage-independent" criteria.

As described in greater detail below, a benefit of this organization is the ability to provide systematic dependency tracking between database tables and application usage, as well as the ability to dynamically reconfigure general purpose applications or application components to perform a variety of different tasks. There are many practical implementations in which these advantages are substantial. For example, if the target database schema is changed, it is not necessary to review every client application for dependencies on the affected tables. Rather, a user may simply query a portion of the database including the middleware tables in order to determine which components in which applications, if any, require adjustment. The adjustments may then be made without re-deploying the application. Rather, the user may simply adjust the compatibility data that are used. As another example, it is possible to create components like scatter plot controls or dendrogram viewers, and connect them to different data at runtime simply by changing the "configuration" of the components. Different configurations for these controls use the same syntax, but the configuration determines the meaning of what the component is doing.

Advantages of the schema-isolated system also are achieved due to the storage of compatibility data in a middleware table, retrieved at runtime by the application using them. In particular, advantages are achieved by organizing SQL statements according to explicit semantic criteria. Although some of this information could be inferred from conventional views by using the system catalog, this would be a purely syntactic organization and would not typically provide clues as to the semantics. In addition, conventional view storage does not permit direct querying of which applications use which view. Yet another advantage is due to the systematic, server-side representation of "selection state" in client applications, as described below. Scientific applications often can be made more powerful by the use of "shared selection state." Although some conventional applications may employ aspects of the shared selection concept, they do not fully realize the potential of this approach. For example, the schema-isolated system allows different selection types to exist concurrently, and maintains the selection state on the server so that it can be shared by components within applications, components in different applications, or components running on different client workstations.

Advantages of the schema-isolated system also are achieved due to the use of advanced data binding to permit rapid construction of applications using COM components. Also, the schema-isolated system enables self-registration of components. These further advantages are also described in greater detail below.

More specifically, in one embodiment the invention is directed to a system (referred to for convenience only as a schema-isolated system) for developing, modifying, or maintaining at least one client application that accesses data in at least one target database. The system includes a middleware-table inserter that inserts at least one middleware table into the target database. It will be understood that the term "insert" is used broadly in this context to refer to any of a variety of known techniques for including or adding information to a table. Also, the term "table" is used broadly to refer to any known technique or method for storing and organizing data. The middleware table includes a set of compatibility data relating one or more client-application data requests with one or more corresponding target-database data capabilities. The system also includes a data communication component that receives a client-application data request from the client application, and, based on at least a first datum of the set of compatibility data, provides to the client application the one or more target-database data capabilities corresponding to the client-application data request. In this system, the first compatibility datum relates the one or more client-application data requests with the one or more corresponding target-database data capabilities based, at least in part, on an application-usage-independent criterion. The term "application-usage-independent criterion" means a criterion based, at least in part, on a syntax criterion, a configuration or semantics criterion, or a component usage criterion. The first compatibility datum may also relate the one or more client-application data requests with the one or more corresponding target-database data capabilities based, at least in part, on an application usage criterion.

In some implementations, the first compatibility datum includes at least one SQL query. The target database may be a relational database.

In other embodiments, the invention is directed to a method for developing, modifying, or maintaining at least one client application that accesses data in at least one target database. The method includes the steps of: inserting at least one middleware table into the target database, wherein the middleware table includes a set of compatibility data relating one or more client-application data requests with one or more corresponding target-database data capabilities; receiving a client-application data request from the client application; and, based on at least a first datum of the set of compatibility data, providing to the client application the one or more target-database data capabilities corresponding to the client-application data request. The first compatibility datum relates the one or more client-application data requests with the one or more corresponding target-database data capabilities based, at least in part, on an application-usage-independent criterion. In yet other embodiments, the invention is directed to a computer program product that, when executed on an appropriate computer platform (which may be a server, workstation, personal computer, or any other type of computer, and may include distributed computer systems) performs a method including the method steps just described.

The above embodiments are not necessarily inclusive or exclusive of each other and may be combined in any manner that is non-conflicting and otherwise possible, whether they be presented in association with a same, or a different, aspect of the invention. The description of one embodiment is not intended to be limiting with respect to other embodiments. Also, any one or more function, step, operation, or technique described elsewhere in this specification may, in alternative embodiments, be combined with any one or more function, step, operation, or technique described in the summary. Thus, the above embodiments are illustrative rather than limiting.

BRIEF DESCRIPTION OF THE DRAWINGS

The above and further advantages of the invention will be more clearly appreciated from the following detailed description when taken in conjunction with the accompanying drawings. In the drawings, like reference numerals indicate like structures or method steps and the leftmost one or two digits of a reference numeral indicate the number of the figure in which the referenced element first appears (for example, the element 210 appears first in FIG. 2).

FIG. 3 is a flow diagram of one embodiment of a method for developing, modifying, or maintaining a client application that accesses data in a target database, in accordance with the present invention;

DETAILED DESCRIPTION

Figure 1:
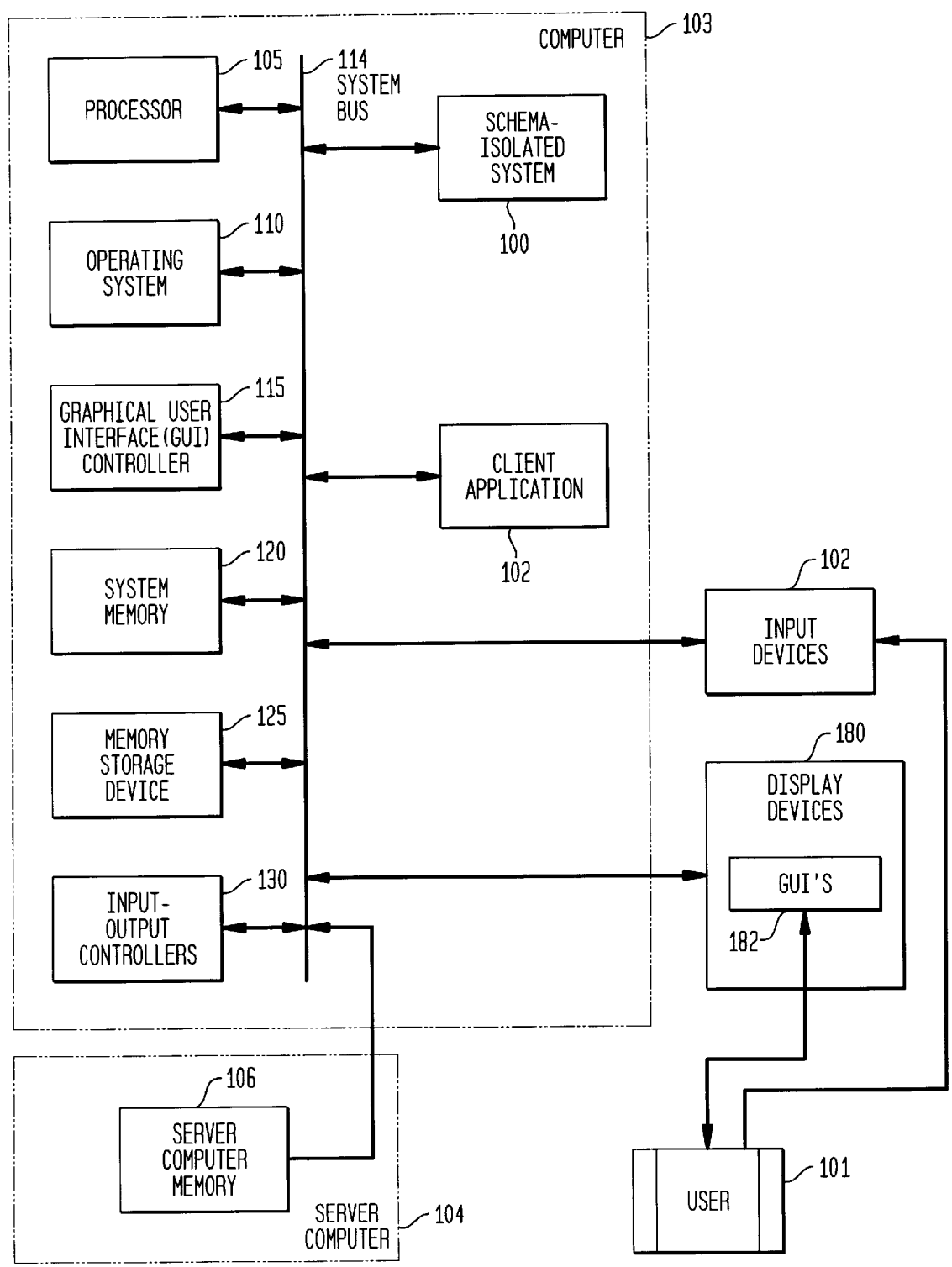
FIG. 1 is a functional block diagram of one embodiment of a computer system upon which one embodiment of a schema-isolated system may be executed in accordance with the present invention.

The attributes of the present invention and its underlying method and architecture will now be described in greater detail with reference to one embodiment of the invention, referred to as schema-isolated system 100. Schema-isolated system 100 may be used to develop, modify, or maintain client applications that access data in a target database.

Generally schema-isolated system 100 is a system for writing applications that access data in relational databases. It provides independence from the database schema without incurring additional programming overhead, and in most cases, it makes developing client applications much easier than is the case with respect to conventional techniques. Schema-isolated system 100 includes of a set of tables, sometimes referred to herein as "middleware tables," that are added to existing relational databases, sometimes referred to herein as "target databases." System 100 also includes a set of ActiveX components that make use of the ActiveX Data Objects (ADO) library. These Active X components are a particular implementation of what is sometimes referred to herein more broadly as "data communication components."

The development and maintenance of client-server software systems, in accordance with system 100, is implemented by storing parameterized SQL commands in a middleware table in the target database itself. When a client application wishes to access the database, it first retrieves the necessary SQL command from this table, and then executes the command directly. In addition to the SQL commands, system 100 also maintains information about user interfaces, user interface components, run-time configurations, and templates that organize SQL commands into semantically related groups. This additional data makes it easier to create, maintain and debug client applications using this architecture.

In addition to a mechanism for managing the interaction between clients and the database, particular implementations of system 100 provide a language-independent COM/ActiveX interface specification for user interface and server components. System 100 in these implementations may also provide several standard components that use this interface, such as list boxes, text boxes, combo boxes, and grid controls. These components can be quickly assembled in Visual Basic (or any other development environment that supports ActiveX controls) and used to create useful applications. In addition, the implementation of these components can be changed (even changing the language they are written in) without requiring any change to the clients that use them.

Also, system 100 specifies a mechanism for communicating selection information between components, which allows applications to provide several simultaneous views of the same data. This shared-selection mechanism is sufficient to create many types of analysis and data entry applications with only a trivial amount of programming.

System 100 may be implemented in hardware, software, firmware, or any combination thereof. In the illustrated embodiment, it generally is assumed for convenience that system 100 is implemented in software. Thus, in the illustrated embodiment, software-implemented functional elements perform the operations of system 100. That is, the functional elements of the illustrated embodiment comprise sets of software instructions that cause the described functions to be performed. These software instructions may be programmed in any programming language, such as C++ or another high-level programming language. System 100 may therefore be referred to as "a set of schema-isolating instructions," and its functional elements may similarly be described as sets of instructions. A computer system, with respect to which system 100 may be operated, is now described.

Computer 103, Input Devices 102, and Display Devices 180

FIG. 1 is a simplified functional block diagram showing one of many possible configurations in which system 100 may cooperate with, or be executed by, a computer 103. The functions of system 100, if implemented in software, typically are implemented by the cooperation of operating system 110 with processor 105 to execute software carrying out these functions. The software instructions typically are stored in system memory 120 and/or memory storage device 125. As shown in FIG. 1, computer 103 may be a computing device specially designed and configured to support and execute some or all of the functions of system 100. Computer 103 also may be any of a variety of types of general-purpose computers such as a personal computer, network server, workstation, or other computer platform now or later developed.

Computer 103 typically includes known components such as a processor 105, an operating system 110, a graphical user interface (GUI) controller 115, a system memory 120, memory storage devices 125, and input-output controllers 130. It will be understood by those skilled in the relevant art that there are many possible configurations of the components of computer 103 and that some components that may typically be included in computer 103 are not shown, such as cache memory, a data backup unit, and many other devices.

Processor 105 may be any of a variety of commercially available processors. Processor 105 executes operating system 110, which may be, for example, Windows 98 or Windows NT operating systems from the Microsoft Corporation; the System 7 or System 8 operating system from Apple Computer; the Solaris operating system from Sun Microsystems; a Unix®-type operating system available from many vendors such as Sun Microsystems, Inc., Hewlett-Packard Company, or AT&T; the freeware version of Unix® known as Linux; the NetWare operating system available from Novell, Inc.; another or a future operating system; or some combination thereof. Operating system 110 interfaces with firmware and hardware in a well-known manner, and facilitates processor 105 in coordinating and executing the functions of various computer programs, such as GUI controller 115, and other computer programs that may be written in high level programming languages. Operating system 110, typically in cooperation with processor 105, coordinates and executes functions of the other components of computer 103. Operating system 110 also provides scheduling, input-output control, file and data management, memory management, and communication control and related services, all in accordance with known techniques.

System memory 120 may be any of a variety of known or future memory storage devices, including, for example, any commonly available random access memory (RAM), magnetic medium such as a resident hard disk or tape, an optical medium such as a read and write compact disc, or other memory storage device. Memory storage device 125 may be any of a variety of known or future devices, including a compact disk drive, a tape drive, a removable hard disk drive, or a diskette drive. Such types of memory storage device 125 typically read from, and/or write to, a program storage device (not shown) such as, respectively, a compact disk, magnetic tape, removable hard disk, or floppy diskette. Any of these program storage devices may be a computer program product. As will be appreciated, these program storage devices typically include a computer usable storage medium having stored therein a computer software program and/or data.

Computer software programs, also called computer control logic, typically are stored in system memory 120 and/or the program storage device used in conjunction with memory storage device 125. System 100 may be implemented by such a computer software program. In some embodiments, the present invention includes a computer program product comprising a computer usable medium having control logic (computer software program, including program code) stored therein. The control logic, when executed by processor 105, causes processor 105 to perform some of the functions of the invention, as described herein. In other embodiments, some functions of the present invention are implemented primarily in hardware using, for example, a hardware state machine. Implementation of the hardware state machine so as to perform the functions described herein will be apparent to those skilled in the relevant arts.

Input-output controllers 130 could include any of a variety of known devices for accepting and processing information from a user, whether a human or a machine, whether local or remote. Such devices include, for example, modem cards, network interface cards, sound cards, or other types of controllers for any of a variety of known input devices 102. Output controllers of input-output controllers 130 could include controllers for any of a variety of known display devices 180 for presenting information to a user, whether a human or a machine, whether local or remote. Graphical user interface (GUI) controller 115 may be any of a variety of known or future software programs for providing graphical input and output interfaces between computer 103 and a user, and for processing user inputs. GUI controller 115 may also be implemented in hardware or firmware, or any combination of hardware, firmware, and software.

In the illustrated embodiment, the functional elements of computer 103 communicate with each other, and with the other functional elements of logic analyzer 100, via system bus 114. Some of these communications may be accomplished in alternative embodiments using network or other types of remote communications, such as when computer 103 is not in the same location, or in the same chassis, as system 100. Also, various other known communication buses, channels, and connections may also be used in a known manner instead of, or in conjunction with, system bus 114.

In the illustrated embodiment, user 101 is assumed to be a human, but it need not be so. User 101 may be a computer, a recording and playback device, or another type of machine.

Schema-isolated System 100

Figure 2:
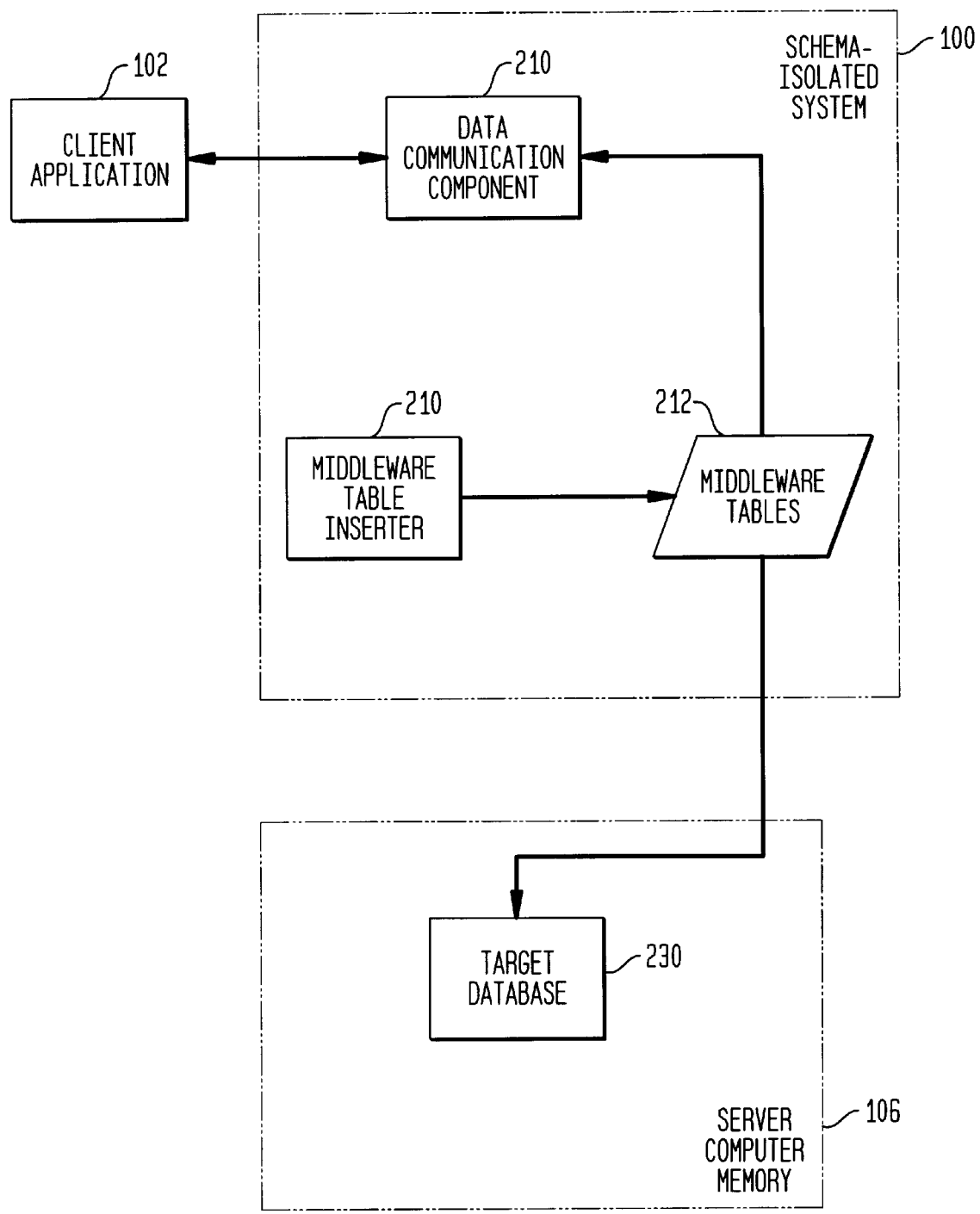
FIG. 2 is a simplified schematic representation of one embodiment of a the schema-isolated system of FIG. 1.

FIG. 2 is a functional block diagram of schema-isolated system 100 of the illustrated implementation. System 100 develops, modifies, and/or maintains at least one client application 102 that accesses data in at least one target database 230. Client application 102 typically is a software application that is executed by processor 105 in cooperation with operating system 110 based on instructions that may be stored in system memory 120.

As shown in FIG. 2, system 100 includes a middleware-table inserter 210. Inserter 210 is constructed and arranged to insert at least one middleware table 212 (hereafter, "middleware tables 212") into target database 230, which may be a relational database. Target database 230 may be stored, for example, in the memory 106 of a server computer 104 that communicates via any of a variety of known channels or networks with computer 103. In other implementations, target database 230 may be stored in computer 103, such as in system memory 120, or may be distributed among computers communicating over a network. Middleware tables 212 include a set of compatibility data relating one or more client-application data requests with one or more corresponding target-database data capabilities. These data are described in greater detail below with respect to an illustrative implementation including SQL queries.

System 100 also includes a data communication component 220 constructed and arranged to receive a client-application data request from client application 102. Based on at least a first datum of compatibility data, component 220 provides to client application 102 the one or more target-database data capabilities corresponding to the client-application data request. The first compatibility datum relates the one or more client-application data requests with the one or more corresponding target-database data capabilities based, at least in part, on an application-usage-independent criterion. As noted above, the application-usage-independent criterion may be a syntax, configuration (also referred to as semantics), and/or component usage criterion. The first compatibility datum may also relate the one or more client-application data requests with the one or more corresponding target-database data capabilities based, at least in part, on an application usage criterion.

FIG. 3 is a flow diagram showing method steps corresponding to the operations just described with respect to system 100. These method steps may be carried out, for example, by a computer software application such as may be represented in some implementations by system 100. As shown in FIG. 3, the method steps include, at step 310, inserting at least one middleware table into the target database. The middleware table includes a set of compatibility data relating one or more client-application data requests with one or more corresponding target-database data capabilities. Step 320 represents receiving a client-application data request from the client application. Step 330 represents the step of providing to the client application the one or more target-database data capabilities corresponding to the client-application data request. This step is based on at least a first datum of the set of compatibility data. In this method, the first compatibility datum relates the one or more client-application data requests with the one or more corresponding target-database data capabilities based, at least in part, on an application-usage-independent criterion.

Further details of the operations of system 100 are now provided with respect to a particular implementation, which will be understood to be illustrative rather than limiting in all respects. To clarify the description, the term "component" is noted to have several possible uses in the art. To avoid confusion, there are important differences that may be noted between the concepts of system 100 components, COM components, and ActiveX components.

A COM component is any unit of code that exposes its functionality according to the COM specification. This may be a broad category, which includes all ActiveX components, the ADO data access components, and a variety of data types ranging from extremely simple to very sophisticated. While the COM specification is very specific about the way in which a COM interface is exposed, it generally does not address how any particular component is created or what that interface may contain.

ActiveX components are COM components that are also user interface components, and that implement a specific (and fairly extensive) set of predefined interfaces that support drawing, printing, resizing, event handling, and coordination with their containing view. Examples of ActiveX components might include buttons, list boxes and grids. A schema-isolated system component, or, as in the illustrated implementation, a system 100 component, is most fundamentally a server-side concept. Since it usually corresponds to a single COM or ActiveX component, these components are usually what is meant when discussing a "schema-isolated system component" from the user's perspective. However, it might also correspond to a Visual Basic form, an entire application, or some other unit of code. This is a very flexible concept. To be noted is the usage in the same part of a program can "be" different schema-isolated system components depending on how its state evolves over time. It is this flexibility that allows the schema-isolated system architecture to support a single data access mechanism without dictating the strategy used to write client applications. Thus, developers are free to implement the concept of a schema-isolated system component in whatever way they feel is most appropriate.

Query Templates

The concept of a query template is central to the schema-isolated system architecture. A query template defines, for any given database operation, the data that a client application must provide to the target database, and the data which it requests in return. A query template specifies this mapping abstractly, from the client's perspective; for example, a component that produces a scatter plot must somehow obtain a list of X and Y values from the database, and a query template is the mechanism which describes this requirement. It is not necessary for the client to know how this data is obtained. It "trusts" that, by using the appropriate query template, it will obtain the desired result set or update the appropriate table. Query templates are identified using a globally unique identifier (GUID) string, and are associated with a set of fields and parameters that describe its interaction with the database. A value for each parameter must be provided by the client application, and the template will in return generate a record set containing each of the desired fields. Most applications and components will use multiple query templates, one for each result set or operation the component requires. Templates can also be reused between different components when appropriate.

Queries

A schema-isolated system query is the piece of SQL code, stored in the target database, that implements the client/database mapping described by its associated query template. The SQL code accepts parameters using question marks as placeholders for parameter values, and maps data from the database into the fields required by the query template. For example, suppose that the scatter plot component mentioned above was used in an application that is intended to provide a plot of age versus. weight for a group of people. A query that provides data for the scatter plot might be written as follows:

SELECT
tblPerson.Age as X,
tblPerson.Weight as Y
FROM
tblPerson

In this case, the Age and Weight fields are mapped into fields named X and Y in the record set that the query template returns. If the schema is changed so that, say, a person's birth date is stored instead of their age, this query could be updated to read:

SELECT
CurrentDate( )—tblPerson.BirthDate as X,
tblPerson.Weight as Y
FROM
tblPerson Since the resulting record set would be identical, the client using the associated template would not be affected by this change.

Components

Conceptually, schema-isolated system components are discrete units of functionality that are related to a set of query templates that provide access to the underlying target database. While in practice, a component could be a single ActiveX component, a single form in an application, or an entire application, it is expected that a component will consist of a relatively small, reusable part of a larger application, regardless of how it is implemented. Its query templates will thus form a small, functionally coherent set whose relationships are easily identified and understood.

Like a query template, a component is identified by a GUID, and is represented by a record in the schema-isolated system database schema. It is associated with a Form (see below) through a ComponentRole relationship, that describes its purpose in the application.

Forms

A Form is a grouping of Components that are in some way logically related. Like Components, Forms can vary in scope, but they are most often associated with all of the components in a single window. The name "Form" was deliberately chosen to evoke the idea of a Visual Basic form, since there will most commonly be a one-to-one relationship between these concepts.

Configurations

A Configuration is used to represent the set of queries that are used by all the templates in all the components on a given form. A form can have more than one configuration, and the configuration can be changed while the client application is running. So, in the scatter plot example above, a form could use one configuration to plot age vs. weight, and another to plot age vs. height. The different queries used by each configuration would be written to retrieve the appropriate data in each case. Queries can be reused between configurations, so it would not be necessary to duplicate queries that would be otherwise identical between configurations.

Sessions

A schema-isolated system session is used to coordinate the activity of different components being used in a particular application. As components need to communicate with each other through the database, the Session concept is necessary to distinguish the server-side state maintained for multiple copies of the same application being run by different users.

Selection

The concept of shared selection state is a useful way of coordinating the activities of different components. The Windows Explorer, for example, uses the selected directory in the tree view in its left pane to determine the list of files and directories to display in its right pane. More sophisticated user interfaces can be developed by allowing the simultaneous selection of multiple object types.

The schema-isolated system selection mechanism operates on two levels: the shared server-side selection state, and the client-side events that communicate changes in selection state between components. On the server side, a selection record consists of the Session ID in which the object was selected, the type of object being selected, the reason (or role) for which the object was selected, and the numeric ID of the selected object. In order to use this mechanism, an object to be selected must have a single, unique, numeric primary key, a restriction which is satisfied in most well-designed relational databases.

On the client application side, when a component changes its selection, it fires a SelectionChanged event, which is intercepted by the containing application. When this event occurs, the application determines what other components must be updated in order to reflect the new selection, and calls the appropriate methods in these components.

Components maintain zero, one or more selection categories, which allow the selection of multiple object types by a single component. For example, a pivot table component might have one selection category that corresponds to a row item, and another that corresponds to a column item. The objects selected in each case would be of different types, and those types will generally not be known at the time the component is developed. Selection categories provide a mechanism to map the data-independent concept of selection to more specific selection behavior that is determined when the component is used.

While selection is a primary communication mechanism between components, and is sufficient for most cases, application and component developers are free to set up whatever server-side communication mechanisms they wish. While a component generally must contain special templates in order to use custom communication methods, the server-side details of these methods can be determined by the person developing the queries for any given configuration.

The Schema-isolated System Database Architecture

The schema-isolated system database architecture consists of a set of tables (referred to as the middleware tables)

that are created in the same database that the clients operate on; i.e., the target database. These tables have no explicit references to or from other tables in the database, so they can be added or removed without affecting the existing schema. The middleware tables maintain information about the structure of clients accessing the database, the SQL commands that bind clients to the database, and server-side client state information that is used to coordinate the activities of different schema-isolated system components.

Figure 4A:
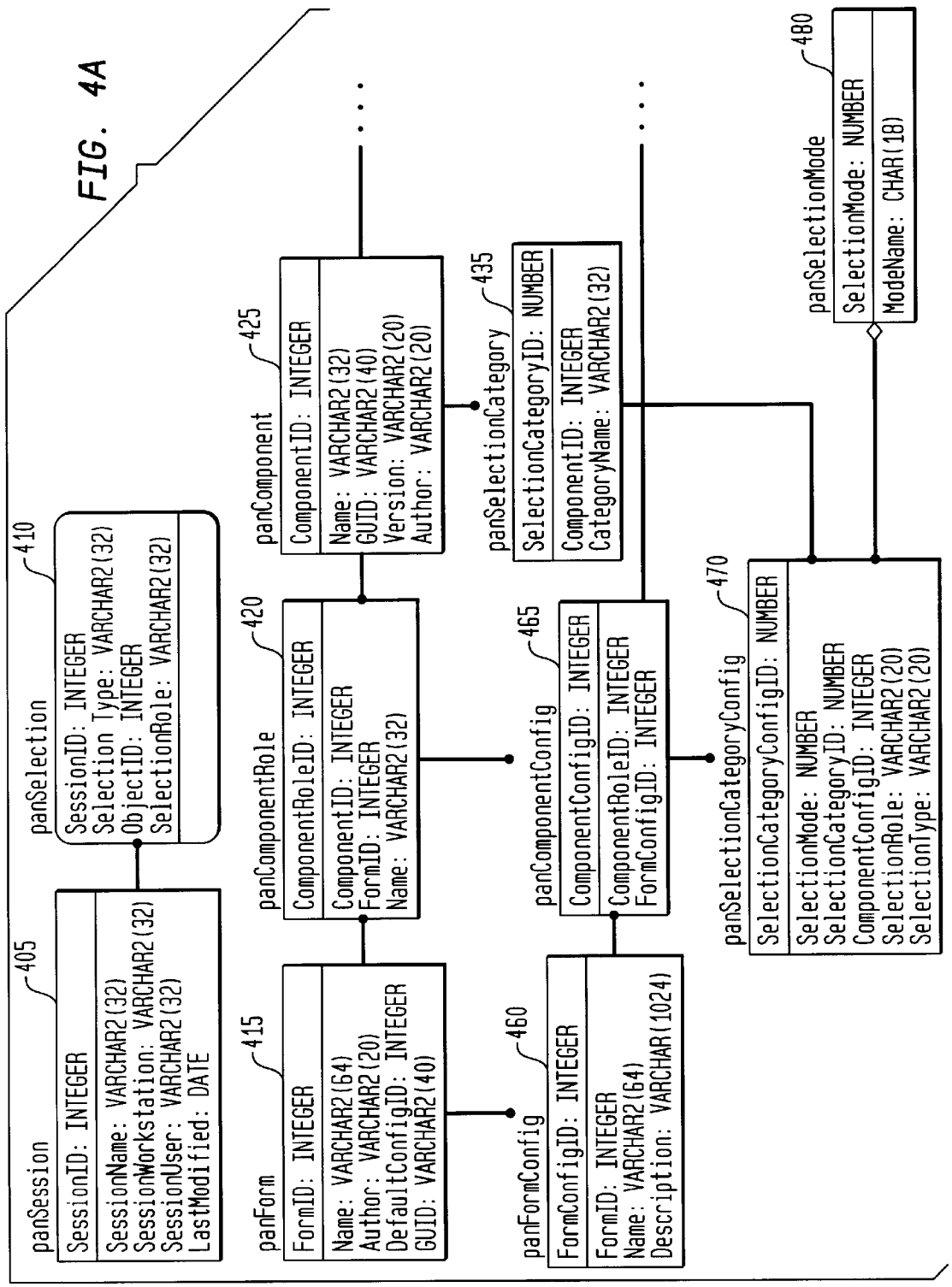
FIGS. 4A and 4B are a database schema diagram of one embodiment of a middleware table of the schematic isolated system of FIG. 2.
Figure 4B:
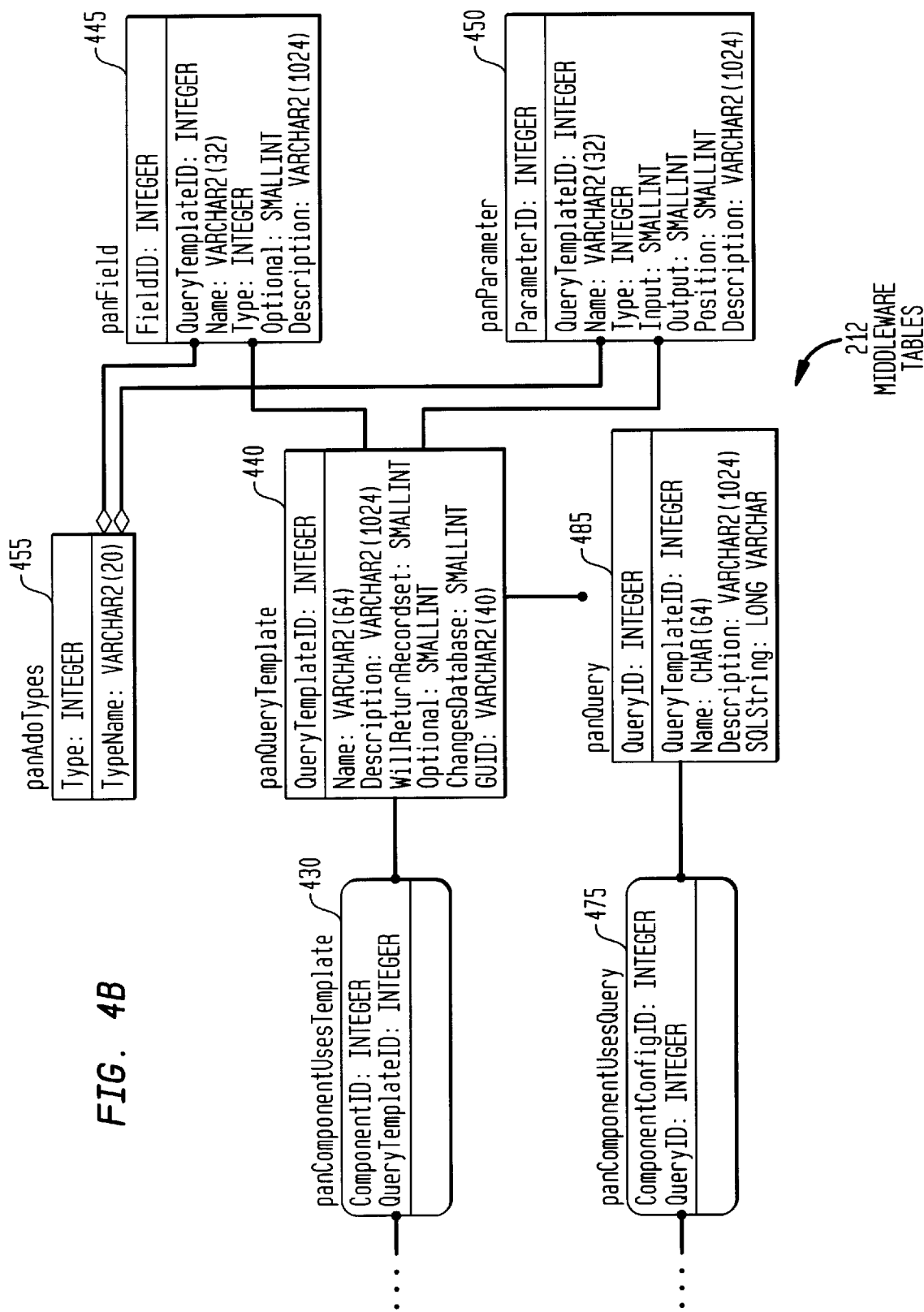

Considering the data model diagram shown in FIGS. 4A and 4B, one can divide the middleware tables 212 shown in this implementation into three major parts. The first part, consisting of the Session and Selection tables 405 and 410, respectively, are concerned with inter-component communication through the selection mechanism described above. The row of tables across the middle of the diagram, starting with panForm (415) on the left and extending through Component Role (420), Component (425), Component Uses Template (430) SelectionCategory (435), QueryTemplate (440), Field (445), Parameter (450), and ADO Types (455) are concerned with component classes and the use of those components in user interfaces. The remaining tables, along the bottom of the diagram, are concerned with how those components are configured to interact with a particular database schema. These tables are FormConfiguration (460), ComponentConfiguration (465), SelectionCategoryConfiguration (470), ComponentUsesQuery (475), SelectionMode (480), and Query(485).

The middleware table forms a description of how a schema-isolated system-compliant application interacts with the database. It is a self-contained system that imposes no additional restriction on how clients are implemented. Any client which maintains the relevant information about itself in the schema-isolated system database, and which accesses the database only through queries retrieved from the Query table, is a schema-isolated system application, and enjoys all the same maintenance benefits as any other schema-isolated system application. However, writing such an application is made much easier by the schema-isolated system Component Architecture, a system of ActiveX components designed to take care of most common application requirements.

The Schema-isolated System Component Architecture

Figure 5:
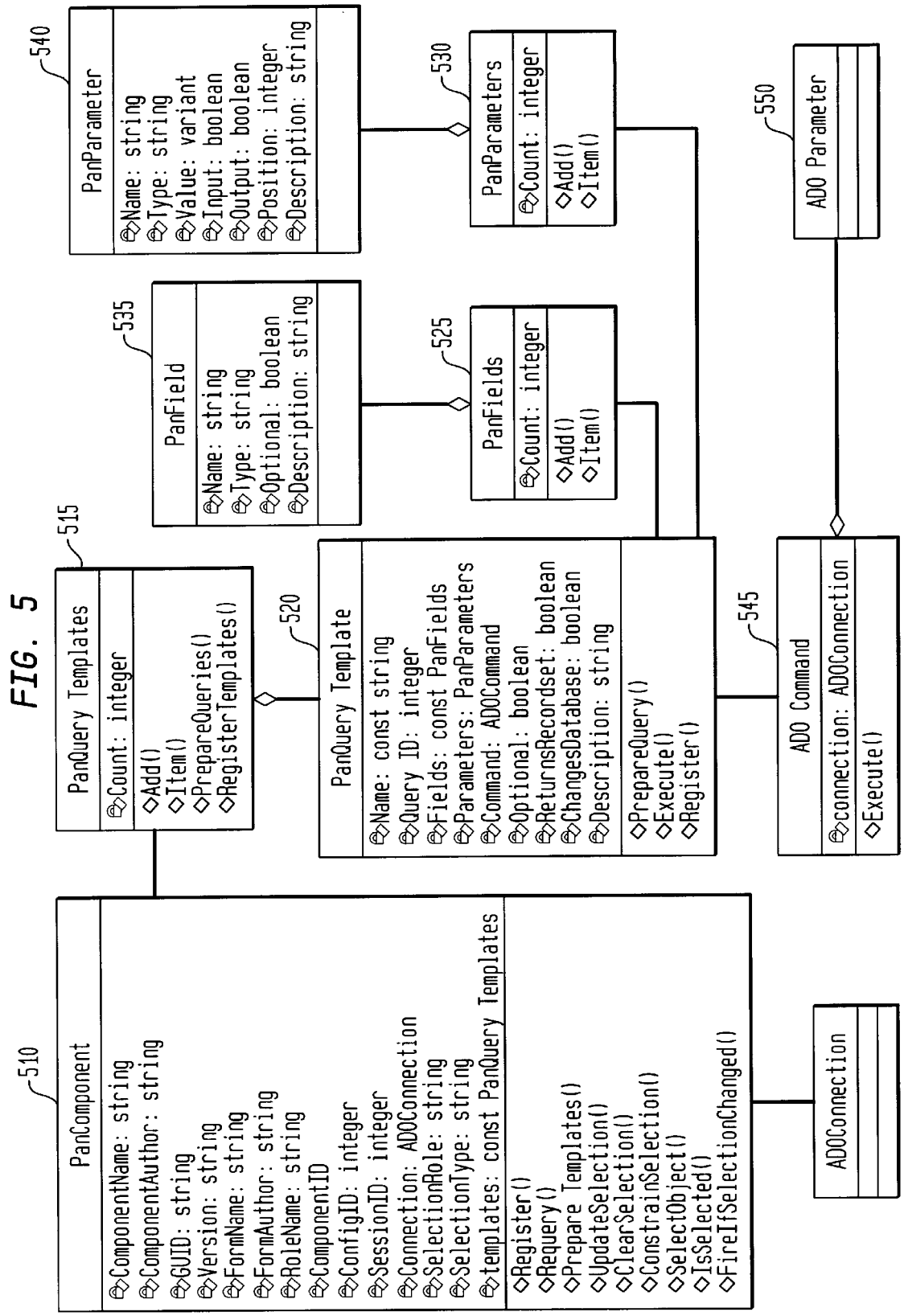
FIG. 5 is an object model diagram of some data communication components of the schematic isolated system of FIG. 2.

The schema-isolated system component architecture, shown in FIG. 5, which is an object model, includes in the illustrated implementation a set of ActiveX interfaces, and components which implement this interface in a way that is easy to reuse in other applications. Some components are full-fledged ActiveX controls that can be dragged and dropped into a Visual Basic (or other development environment) form, while other components are COM components that might implement only the schema-isolated system interfaces. One component in particular, the PanComponentCore component, is designed for reuse by aggregation in Visual Basic forms and custom controls, making the development of custom schema-isolated system components much easier. The PanComponentCore component is a subclass of the PanComponent Class (510) of FIG. 5.

The schema-isolated system component architecture reflects much of the schema-isolated system database architecture in a form that is more suitable for individual client applications. The Form (415), Component (425), Query Template (440), Parameter (450) and Field (445) tables correspond to the IPanForm, IPanComponent, IPanQueryTemplate, IPanParameter, and IPanField interfaces respectively. These interfaces correspond to objects with corresponding names in FIG. 5, e.g., IPanComponent is the interface corresponding to the class PanComponent (510). The database tables can be loosely thought of as metaclasses of the client-side components.

Synchronization between client-side objects and the corresponding database tables occurs through two methods, Register( ) and Prepare( ), which are present in several interfaces. Generally speaking, Register( ) copies information from the client side to the database side, while Prepare( ) copies information from the database to the client. The correspondence between Form, Component and QueryTemplate objects and their respective database tables is maintained through a globally unique identifier (GUID) string, whereas other objects are identified through their Name field and their relationships to other objects.

When developing a new component, the component developer specifies attributes such as what query templates are used, what the name of the component is, and so on. Rather than having to manually register the same information on the server side, the application developer using the new component simply calls the Register method, and the component registers itself. When a schema-isolated system application is started up, it will typically need to obtain information from the database about the records that correspond to its components, such as the database-specific ID of each corresponding record, and, most importantly, the SQL commands it needs to interact with the database. This is all performed in the Prepare method of the IPanComponent interface.

When a component needs to actually interact with the database, it calls the Execute method on the appropriate IPanQueryTemplate object. This method sends the SQL command loaded during the Prepare( ) method to the database, and retrieves any results in the form of an ADO recordset.

Finally, selection state is maintained by IPanSelectionMap objects, which correspond to SelectionCategory records associated with each component in the database. The IPanSelectionMap interface contains methods to easily access the selection state of a schema-isolated system component and keep it synchronized with the server-side selection state. At the IPanComponent level, selection-maintenance is performed by additional methods that map to IPanSelectionMap objects, although these objects are not exposed themselves. It is also possible to use the IPanSelectionMap interface without an associated schema-isolated system component, for specialized selection-state manipulation.

Using the Schema-isolated System Architecture

There are several ways to create schema-isolated system applications. Typically, an application will use a combination of methods as appropriate. However, an application should not access the database schema directly, as the maintenance benefits of a fully schema-isolated system-compliant application may be lost.

Choosing a Language

Schema-isolated system applications can be created in any language that supports database access. The schema-isolated system component architecture can be used in any language that supports COM, such as C++, Visual Basic, Java, and Delphi. However, the choice of language does influence the approach used. Only C++ applications can reuse the source code that was used to create the schema-isolated system components themselves, and only Visual Basic applications can reliably use components that were created with Visual Basic. Each approach discussed below lists the set of languages that can be used with that approach, and the relative difficulties in each case.

Custom Applications

The most time consuming way to write a schema-isolated system application is to not use the component architecture at all, but instead, to write an application that interacts directly with the schema-isolated middleware tables. This is not recommended, due to the difficulty of implementing such an application, and the risk of corrupting the schema-isolated system database itself. However, this is the only approach that works with languages that do not support COM, including PL/SQL.

Using Prewritten Schema-isolated System Components

Several schema-isolated system components have already been written in Visual Basic, including select list, combo box, text field, and grid components. It is possible to use these components by simply dragging them onto a Visual Basic form, writing the appropriate initialization code in the Form.Load( ) method, and writing the corresponding queries using the Query Editor. This is the simplest way to create a schema-isolated system application, and it is possible to create many useful, non-trivial systems using this approach. The Query Editor itself, for example, was created using this method. As more components become available, and existing components develop more functionality, this approach will become increasingly useful.

At present, only Visual Basic applications can use components written in Visual Basic. This is due to limitations associated with the Visual Basic custom control creation mechanism. It is possible that future versions of Visual Basic will correct this deficiency.

Using PanComponentCore Directly

In cases where the appropriate prewritten components are not available, or where specialized computations or analyses are required, the PanComponentCore object can be used to implement the routine aspects of a schema-isolated system application, including component registration and preparation, and query template execution. This strategy can be used in any language that supports COM. Visual Basic, Delphi and Microsoft's Java support COM objects directly, while Visual C++ simplifies access to COM objects through the #import directive. Using C or standard C++ is somewhat more difficult, as the syntax for instantiating and accessing COM objects is relatively convoluted.

An instance of a PanComponentCore object can be made to map to Component records in the middleware table by setting the GUID properties of both the PanComponentCore objects and its associated query templates. Even though from the COM perspective, there is only one PanComponentCore class, from the database perspective, instances of PanComponentCore can be associated with any new or existing schema-isolated system component type.

Writing Custom Schema-isolated System Components

Rather than using PanComponentCore directly, it is a good idea to encapsulate the functionality of schema-isolated system components in corresponding COM/ActiveX components. This offers maintenance benefits for large applications while making the resulting components maximally reusable. There are many approaches to writing custom components in any COM-supporting language. The four primary strategies are writing custom classes or controls in Visual Basic, and writing custom COM objects and controls using ATL in C++.

In the case of Visual Basic classes and controls, the "Implements IPanComponent" directive is used to cause the class or control to expose the IPanComponent interface. This also causes the development environment to enforce the implementation of each method and property in the interface.

Almost all of the IPanComponent interface can then be implemented by creating a class- or control-level PanComponentCore object, and redirecting each method call to this aggregated object. (Since neither Visual Basic nor COM supports implementation inheritance, this can be thought of as a "manual" inheritance mechanism.) Custom behavior can be implemented by adding new methods or properties, or "overriding" existing methods by providing an alternative implementation.

Creating custom components using ATL may be more complicated, but may offer significant performance benefits. A C++ class, IPanComponentImpl, can be mixed into a COM class or ActiveX control created using typical ATL component creation techniques, and any custom behavior implemented by overriding or adding new methods as necessary. This strategy requires access to the C++ source code for the standard schema-isolated system components. An alternative to sharing the IPanComponent implementation at the source level is to aggregate the PanComponentCore functionality using the COM aggregation mechanism (which is not supported by Visual Basic). In this case, only the compiled DLL is required, although this approach is considerably more complicated than source-level reuse.

The Query Editor

Not surprisingly, it is difficult to develop and maintain queries in the Query table without a tool to assist in this process. The Query Editor is a tool, itself built using schema-isolated system components, which allows the user to maintain queries in a simple and intuitive manner.

Figure 6:
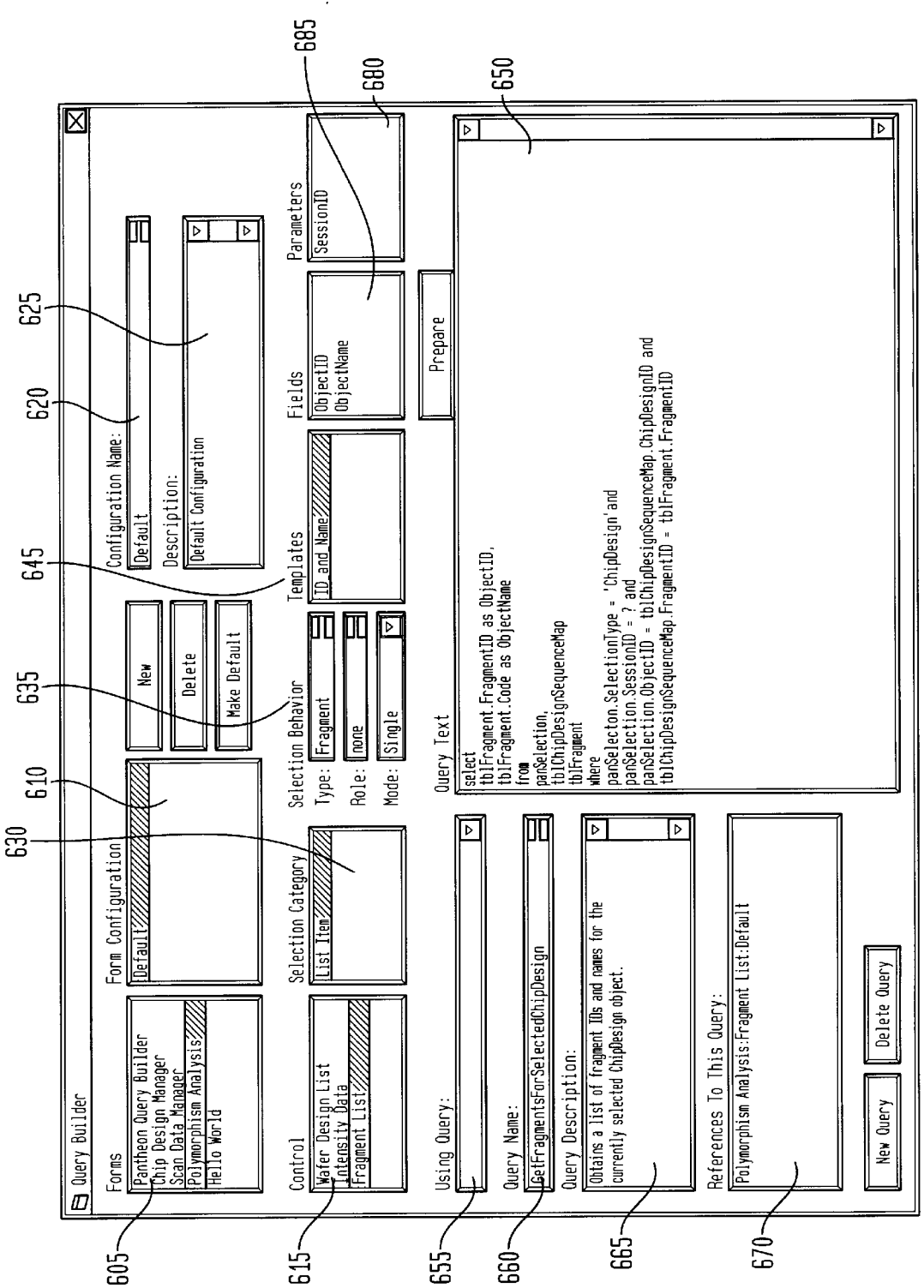
FIG. 6 is a graphical representation of a screen shot of a query editor interface of schematic isolated system of FIG. 2.

FIG. 6 is a graphical representation of a screen shot of the query editor interface as it is being used to edit a query. The Forms list (605) in the upper left corner of the window provides a list of forms registered in the middleware tables. Selecting a form causes a list of available form configurations to be displayed in the Form Configuration list (610), and a list of controls used on the form in the Control list (615). Each "control" in this list corresponds to a ComponentRole record. Selecting a Form Configuration causes the configuration name and description to be displayed in the associated fields in the upper right hand corner of the window (620 and 625, respectively). The New and Delete buttons create and delete form configurations, whereas the Make Default button sets the currently selected form configuration to be the one that is loaded by the schema-isolated system by default at startup. The SelectionCategory list (630) displays the selection categories (if any) supported by the selected Control object. The selection behavior (635)—Type, Role, and Mode—controls the type of object selected by this control in the currently selected configuration, the selection role, and whether single, multiple or no selection is allowed.

The Templates list (645) displays the query templates required by the currently selected control, and the Fields (685) and Parameters (680) lists show the fields and parameters associated with the selected template.

When a form, control, form configuration, and query template object are specified by selecting them in their respective lists, it is possible to create or edit a query associated with those four objects. The New Query button creates a new query record, and the text of the query can be edited in the Query Text field (650). Other, pre-existing queries can be selected in the "Using Query" combo box (655), and the query can be documented using the Query Description and Query Name (660) fields.

In the case where, angle query is used more than once, the field (670) labeled "References To This Query" displays the other references in the format <form>:<control>:<configuration>. In the case shown here, only one configuration—the currently selected one—references the query, so changing this query will not affect any other clients. When editing a query with multiple references, care must be taken to ensure that the changes will not adversely affect other clients or configurations.

How Schema-isolated System Relates to Other Architectures

The schema-isolated system architecture has functionality that overlaps with several other data access architectures, and combines features from each architecture in a way that is appropriate for scientific computing. This section describes the relationship between schema-isolated system and several other data access approaches, discussing its relative merits and deficiencies.

Compound Selection Keys

In order to use the schema-isolated system selection mechanism, it is required that objects being selected have a single, unique primary key. This is not always the case, even in well-structured databases. Frequently, a primary key consists of two foreign keys which together form a unique key. Support for such compound keys, as well as non-numeric keys, will increase the range of applicability of the schema-isolated system selection mechanism. The current workaround for this problem is to either add a unique numeric key to the object, compute some function of the key components which results in a unique number, or implement a custom component which uses its own selection mechanism.

Query Rewriting Rules for Dynamic SQL

Parameterized queries are limited in their dynamism. For example, it is not usually possible to pass a table or column name as a parameter to a query; the name must be hard-coded into the query text itself. One way to overcome this limitation is to incorporate query-rewriting rules, so that when certain escape characters are encountered in a SQL command that is loaded from the database, the schema-isolated system knows to apply query-rewriting rules, which themselves might be derived from the results of other queries or parameter values.

The Schema-isolated System Database Model

Table: panAdoTypes

Description: Maintains a list of ADO type constants and the human-readable names for each type. Used by the Field and Parameter entities to describe themselves. The ADO type names and constants are used for convenient use by  ADO-based clients.

| Name | Datatype | Comment | PK | FK |
|---|---|---|---|---|
| Type | NUMBER | An NUMBER value corresponding to the ADO type constant. | Yes | |
| TypeName | VARCHAR2(20) | The name of the ADO type, taken from the type names used in the ADODB.DataTypeEnum enumeration. | | |

Table: panComponent

Description: Represents a schema-isolated system component, that is, a unit of software that uses a set of query templates to access a database. A Component will typically represent an ActiveX or COM component, but may instead represent part or all of the functionality of a client application independently of what unit of client-side software it corresponds to.

| Name | Datatype | Comment | PK | FK |
|---|---|---|---|---|
| ComponentID | NUMBER | Primary key | Yes | |
| Name | VARCHAR2(32) | The human-readable name for the component. | | |
| GUID | VARCHAR2(40) | The GUID which is used to identify components at runtime. The use of a GUID prevents ambiguities that would occur if two developers used the same name for two different components. | | |
| Version | VARCHAR2(20) | A version number for the component. | | |
| Author | VARCHAR2(40) | The name of the person who developed the component. | | |

Table: panComponentConfig

Description: Represents the available configurations of a component—its selection behavior, and what queries can be mapped to its query templates.

| Name | Datatype | Comment | PK | FK |
|---|---|---|---|---|
| ComponentConfigID | NUMBER | Primary key for the ComponentConfig table. | Yes | |
| ComponentRoleID | NUMBER | The component role that this configuration is associated with. | | Yes |
| FormConfigID | NUMBER | The form configuration that this component configuration is associated with. | | Yes |

Table: panComponentRole

Description: Represents the use of a component on a form. For example, a SelectList component might be used on a Visual Basic form to select employees; employee selection is the "role" of the component, and the corresponding ComponentRole entity might have the Name of "EmployeeList".

| Name | Datatype | Comment | PK | FK |
|---|---|---|---|---|
| ComponentRoleID | NUMBER | Primary key for the ComponentRole table. | Yes | |
| FormID | NUMBER | The Form on which the associated Component is placed. | | Yes |
| ComponentID | NUMBER | The component for which this ComponentRole is defined. | | Yes |
| Name | VARCHAR2(32) | The name of the component's role on the form; in other words, the name for an instance of the component in a particular user interface. | | |

Table: panComponentUsesQuery
Description: Relates a particular query to a component configuration. Indicates that when the associated configuration is loaded, the associated query is loaded into its query template.

| Name | Datatype | Comment | PK | FK |
|---|---|---|---|---|
| QueryID | NUMBER | | Yes | Yes |
| ComponentConfigID | NUMBER | | Yes | Yes |

Table: panComponentUsesTemplate
Description: Establishes an association between a Component and a QueryTemplate, indicating that the component can use data in the form specified by that QueryTemplate. A component may not associate with the same query template more than once, although the same query template may be used by more than one component.

| Name | Datatype | Comment | PK | FK |
|---|---|---|---|---|
| QueryTemplateID | NUMBER | | Yes | Yes |
| ComponentID | NUMBER | | Yes | Yes |

Table: panField
Description: When associated with a QueryTemplate, the Field entity indicates that the template is to return a recordset containing a field with the specified characteristics.

| Name | Datatype | Comment | PK | FK |
|---|---|---|---|---|
| FieldID | NUMBER | Primary key for the Field table. | Yes | |
| QueryTemplateID | NUMBER | The query template which provides result sets containing this Field. | | Yes |
| Type | NUMBER | The ADO type constant indicating the data type returned in this field. | | |
| Optional | SMALLINT | If non-zero, then the client using the associated template does not require that this field be present in the result set. | | |
| Description | LONG VARCHAR | A description of the field, which can be used in a query editor to document the use of the field in a query template. | | |
| Name | VARCHAR2(32) | The name of the field, exactly as it appears in the resulting result set. Not case-sensitive, but for clarity it is a good idea to reference the field in client code in exactly the way it appears here. Note that some database systems may impose constraints on field names that are not enforced by the schema-isolated system data model. | | |

Table: panForm
Description: Represents a set of components, each operating in a particular role (ComponentRole) and in some way dependent on each other. A Form entity most often maps to a "form" in a user interface, such as a Visual Basic form, but more generally, it can be associated with several user-interface forms, part of a form, or an entire application.

| Name | Datatype | Comment | PK | FK |
|---|---|---|---|---|
| FormID | NUMBER | Primary key for the Form table. | Yes | |
| Name | VARCHAR2(64) | The name of the form. | | |
| Author | VARCHAR2(20) | The name of the person who developed the form. | | |
| DefaultConfigID | NUMBER | The ID of the default configuration for this form. This configuration will be loaded by default when the form starts up. | | |
| GUID | VARCHAR2(40) | A unique identifier for the form, to avoid ambiguities in case two forms with the same name are created. | | |

Table: panFormConfig
Description: Represents a coherent set of interdependent ComponentConfig entities. Usually, it does not make sense for every component in a user interface to change its configuration independently of all the others; the configurations must be related so as to allow the components to interoperate correctly. The FormConfig entity aggregates ComponentConfigs that are related in this way.

| Name | Datatype | Comment | PK | FK |
|---|---|---|---|---|
| FormConfigID | NUMBER | Primary key for the FormConfig table. | Yes | |
| FormID | NUMBER | The ID of the form this configuration is associated with. | | Yes |
| Name | VARCHAR2(64) | A human-readable name for the form configuration. | | |

| Name | Datatype | Comment | PK | FK |
|---|---|---|---|---|
| Description | LONG VARCHAR | Documentation for the form configuration, specifying the overall intent of the form. This field can be used in a query editor to assist in developing queries for this configuration. | | |

Table: panParameter

Description: Specifies that a QueryTemplate requires a parameter of the described type in order to function. Parameters may be optional, in which case it is not required that the component provide them when executing the query template. Generally, parameters are associated with question mark placeholders in queries that conform to the associated query template, so the position of parameters in the parameter list is important.

| Name | Datatype | Comment | PK | FK |
|---|---|---|---|---|
| ParameterID | NUMBER | Primary key for the Parameter table. | Yes | |
| QueryTemplateID | NUMBER | The ID of the query template that uses this parameter. | | Yes |
| Name | VARCHAR2(32) | The human-readable name for the parameter. | | |
| Output | SMALLINT | If true, this parameter is an output parameter whose value will be set after the query template has executed. | | |
| Input | NUMBER | If non-zero, this parameter is an input parameter whose value must be set prior to executing the associated query template. | | |
| Position | NUMBER | The position of the parameter in the parameter list. This is important, as most database systems use a question mark as a parameter placeholder, and placeholders have values substituted in the order they are encountered in the query string. | | |
| Type | NUMBER | The ADO type constant for the parameter. | | |
| Description | LONG VARCHAR | A description of the parameter, which can be used in a query editor to assist in the development of queries that conform to the associated query template. | | |

Table: panQuery

Description: This entity maintains queries that conform to their associated QueryTemplates, and which are used in particular component configurations by way of the ComponentUsesQuery association.

| Name | Datatype | Comment | PK | FK |
|---|---|---|---|---|
| QueryID | NUMBER | Primary key for the Query table. | Yes | |
| QueryTemplateID | NUMBER | The ID of the query template to which this query conforms. The query must accept the parameters specified in the template, and return at least the template's non-optional fields in the result set it produces. | | Yes |
| Name | CHAR(64) | A human-readable name for the query. | | |
| Description | VARCHAR2(102) | A description of the query, which is intended to aid maintenance by providing a plain-English interpretation of what the query does. | | |
| SQLString | LONG VARCHAR | The SQL command that is executed by the associated query template when this query is loaded. | | |

Table: panQueryTemplate

Description: QueryTemplates represent the "contract" between a component and the queries that the component uses to retrieve and update data in the database. A query that conforms to a given QueryTemplate must return a recordset containing at least the non-optional fields associated with that template, and must accept all the non-optional parameters associated with that template. A QueryTemplate is identified by its GUID, and may or may not change the database or return a recordset, depending on how it is specified.

| Name | Datatype | Comment | PK | FK |
|---|---|---|---|---|
| QueryTemplateID | NUMBER | | Yes | |
| Name | VARCHAR2(64) | The human-readable name of the query template. | | |
| Description | LONG VARCHAR | A description of the purpose of the query template, intended to aid in the development of queries that adhere to the template. | | |
| WillReturnRecordset | SMALLINT | If non-zero, specifies that the associated query will return a result set. | | |
| Optional | NUMBER | If non-zero, it indicates that this template is not required by the components that use it. | | |
| ChangesDatabase | NUMBER | If non-zero, indicates that execution of the template may change data in the database. Otherwise, the template only reads data and does not change anything. | | |

-continued

| Name | Datatype | Comment | PK | FK |
|---|---|---|---|---|
| GUID | VARCHAR2(40) | A GUID string which serves to prevent ambiguity in the case where different templates have the same name, | | |

Table: panSelection

Description: Represents the selection of a particular object in the database in the context of a particular user session. Any type of database object may be selected so long as it has a unique, numeric, primary key.

| Name | Datatype | Comment | PK | FK |
|---|---|---|---|---|
| SessionID | NUMBER | The ID of the session in which the selection took place. | Yes | Yes |
| ObjectID | NUMBER | The ID of the object being selected. The selected object must have a unique, numeric primary key | Yes | Yes |
| SelectionRole | VARCHAR2(32) | The role in which the selection has been made. This is not always necessary, as in most interfaces, the type alone is sufficient. However, in cases where objects of the same type are being selected for different reasons, this identifies objects in each role. For example, in an interface that displays data about the relationship between a supervisor and a subordinate, both the subordinate and the supervisor might be represented by objects of type Employee. However, one employee would be selected in the Supervisor role, and the other in the Subordinate role. | Yes | |
| SelectionType | VARCHAR2(32) | The type of the object being selected. Generally, this is the name of the referenced table, with any prefix or suffix removed. | Yes | |

Table: panSelectionCategory

Description: Represents the "category" of objects a component might select, from the component's perspective, independent of the data type that component is selecting in a particular configuration. For example, in a SelectList component, the "selection category" might be named ListItem. Some components, such as buttons, are not capable of selecting anything, and thus have no SelectionCategory associated with them. Others, such as a pivot table, might have separate selection categories for RowItems and ColumnItems, which would be configured at runtime to select different types of objects. This is distinct from both the SelectionType and SelectionRole concepts, which are maintained in the panSelection table and specified for a particular configuration in the SelectionCategoryConfig table.

| Name | Datatype | Comment | PK | FK |
|---|---|---|---|---|
| SelectionCategoryID | NUMBER | The primary key for the SelectionCategory table. | Yes | |
| ComponentID | NUMBER | The ID of the component that uses this SelectionCategory. | | Yes |
| CategoryName | VARCHAR2(32) | The name of the selection category. For a select list component, this might be "List Item". For a scatterplot component that allows points to be selected, it might be "Point". | | |

Table: panSelectionCategoryConfig

Description: For a particular SelectionCategory and a particular ComponentConfig, this entity specifies the data type being selected, the role in which it is being selected, and whether single or multiple selection is allowed. For example, a SelectList component might have a category called ListItem, which in a particular configuration, might have a SelectionMode of "single selection" and a SelectionType of "employee".

| Name | Datatype | Comment | PK | FK |
|---|---|---|---|---|
| SelectionCategoryConfigID | NUMBER | Primary key for the SelectionCategoryConfig table. | Yes | |
| SelectionCategoryID | NUMBER | The selection category that this configuration applies to. | | Yes |
| ComponentConfigID | NUMBER | The component configuration that this selection category configuration is a part of. | | Yes |
| SelectionRole | VARCHAR2(20) | The role of the object being selected in this configuration. See the Selection table for details. | | |
| SelectionType | VARCHAR2(20) | The type of the object being selected in this configuration. See the Selection table for details. | | |
| SelectionMode | NUMBER | A value, documented in the SelectionMode table, that specifies whether the configuration supports single, multiple, or no selection. | | |

Table: panSelectionMode

Description: Provides a mapping between selection mode constants and the human-readable names for those constants. The three supported modes are currently "no selection", "single selection" and "multiple selection".

| Name | Datatype | Comment | PK | FK |
|---|---|---|---|---|
| SelectionMode | NUMBER | The ID of the selection mode. | Yes | |
| ModeName | CHAR(18) | The name of the selection mode. | | |

Table: panSession
Description: A Session entity serves to provide a context in which components can interoperate without interfering with the operation of components being run by other users on other machines. Specifically, it is used to allow different users to maintain server-side selection state information, although it could be used for other types of server-side communication as well.

| Name | Datatype | Comment | PK | FK |
| --- | --- | --- | --- | --- |
| SessionID | NUMBER | The primary key for the Session table. | Yes | |
| SessionName | VARCHAR2(32) | The name of the session. | | |
| SessionWorkstation | VARCHAR2(32) | The name of the workstation from which this session was initiated. | | |
| SessionUser | VARCHAR2(32) | The name of the user that initiated the session. | | |
| LastModified | DATE | Currently unused. In the future, this may be used to support server-side data communication between different workstations by indicating that server-side data has been altered. | | |

The Schema-isolated System Component Model

The following section describes, with reference to FIG. 5, the interfaces in the schema-isolated system component system. This documentation was generated from a UML model, and notates properties, method arguments and return values in the form <property>:<type>. In the case where an interface from another component library is referenced, the notation <library>.<interface>is used.

IpanComponent (510)

Public Attributes

Name: BSTR
   The human-readable name of the component.
Version: BSTR
   The version number of the component.
GUID: BSTR
   A GUID in registry format, without the curly braces, which is set by the developer of the component and is used to uniquely identify the component in the database during component registration and preparation.
ComponentID: log
   The ID of the component in the middleware tables.
ComponentConfigID: long
   The ID of the configuration that was loaded from the middleware tables.
Author: BSTR
   The full name of the person who developed the component.
Form: IPanForm
   A pointer to the IPanForm object which represents the form for this component.
RoleName: BSTR
   The name of the component's role in the form. This is typically set by the developer using the component.
QueryTemplates: IpanQueryTemplates
   The container for the query templates associated with this component.
SelectionChanged: bool
   True if the component's selection state has been changed by the user, but the SelectionChanged event has not been fired.

Public Operations

Register( ):
   Registers the component in the database, updating the panComponent, panComponentRole, panQueryTemplate and other associated tables.
Prepare( ):
   The Prepare method loads configuraion information from the database into the component according to the current FormConfigID in the associated Form object. Calls Prepare( ) in the associated IPanSelectiorMaps, IPanForm, and IPanQueryTemplates objects.
Requery( ):
   Causes the component to requery the database. In the case of a user-interface component, this typically clears whatever data has been loaded, and executes the necessary query templates to load new data.
SelectObject (objectID: long, selCategory: BSTR)
   Selects an object that has been loaded by the component.
ClearSelection (selcategory: BSTR):
   Clear the component's selection.
ConstrainSelection (selCategory: BSTR)
   Calls ConstrainSelection in the selection map associated with the selection category. This has the effect of deselecting all the objects with the component's selection type which are selected in the database but which are not displayed by the component.
IsSelected (objectID: LONG, selcategory: BSTR): bool
   Call this method to determine if a particular object ID has been selected in a particular selection category.
UpdateSelection( ):
   If the server-side selection state has changed, this adjusts the selection state of the component to match it.
FireIfSelectionChanged( ):
   If selectionChanged is true, the SelectionChanged event is fired to inform the container application.

IpanFields (525)

Interface for a Container Which Holds IPanField Objects

Public Attributes

Count: long
   The number of Field objects in the container.

Public Operations

Add (pField: IPanField):
   Adds a Field object to the container.
Item (index: VARIANT):IPanField
   Retrieves a Field object from the container. Can be indexed by either a number or a string.

IpanField (535)

IPanField describes a field that is returned in the result set generated by a query template.

Public Attributes

Name: BSTR
  The name of the field, as it is returned in the query template's result set.
Description: BSTR
  A description of the field.
Type: long
  The ADO data type constant that defines the data type returned in the field.
Optional: BOOL
  If true, the field is an optional component of the result set.

IpanSelectionMap

An IPanSelectionMap object provides an easy to use interface that coordinates the selection state in the client with the selection state in the server. While it is used with the IPanComponent interface, it can also be used independently.

Public Attributes

CategoryName: BSTR
  The name of the selection category the selection map is associated with.
SelectionTypeName: BSTR
  The type of objects the selection map is working with. The type is generally the name of the table, with the prefix removed.
SelectionMode: SelectionModeEnum
  Specifies whether the selection map supports single, multiple, or no selection.
SelectionRole: BSTR
  The role in which the selection map selects objects.
SessionID: long
  The ID of the session in which the selection map is operating.
Connection: ADODB.Connection
  The ADO connection through which the selection map is operating.

Public Operations

AddRetrievedObjectID (objectID: long):
  Adds an object ID to the selection map, so that it can be tracked.
ClearRetrievedObjects( ):
  Removes all objects from the selection map. Does not affect the server-side selection state. Should typically be called from IPanComponent::Requery.
ClearSelection (SelectionChanged: BOOL):
  Clears both the client- and server-side selection state for the given selection type and selection role.
ConstrainSelection (SelectionChanged: BOOL):
  Deselects any objects which are selected in the database but which are not loaded into the component (i.e. which were not added to the selection map by a call to AddRetrievedObjectID). This is useful for cases where, when a component retrieves new data, previously selected objects are not part of the new data set.
IsSelected (objectID: long, selected: BOOL)
  Returns whether a particular object is selected.
SelectObject (objectID: long, select: BOOL, selectionChanged: BOOL):
UpdateFromDB( ):
  Updates the selection map with the server-side selection information.

IpanParameter (540)

Describes a parameter which is accepted by SQL statements conforming to the associated query template.

Public Attributes

Name: BSTR
  The name of the parameter.
Description: BSTR
  A description of the parameter.
Type: long
  The type of the parameter, as an ADO type constant.
Value: VARIANT
  The current value of the parameter, which is copied into an ADODB.Parameter object at query template execution time.
Position: short
  The position of the parameter in the parameter list. The positions of parameters associated with a particular query template must increase consecutively starting from 1.
Input: BOOL
  True if the parameter is an input parameter.
Output: BOOL
  True if the parameter is an output parameter.

IPanForm

Represents a schema-isolated system form. Often corresponds to a Visual Basic form object, but more generally, can be associated with any set of cooperating schema-isolated system components.

Public Attributes

FormID: long
  The ID of the form in the schema-isolated system database (also sometimes referred to as middleware tables).
Name: BSTR
  The name of the form.
GUID: BSTR
  A GUID in registry format, without the curly braces, which uniquely identifies the form in the schema-isolated system database when Register or Prepare is called.
Author: BSTR
  The full name of the developer who created the form.
ConfigID: long
  The ID of the currently loaded form configuration.
SessionID: long
  The ID of the schema-isolated system session the form is using. All schema-isolated system components associated with this form share this session ID.
Connection: ADODB.Connection
  The database connection for the form, which is shared by all associated components.

Public Operations

Register( ):
  Registers the form in the schema-isolated system database, if it does not already exist. If the form was previously registered, it matches the existing form registration using the GUID value, and overwrites its other properties in the database.
Prepare( ):
  Loads information about the form from the database. If the ConfigID property has not been set, it sets it to the default configuration ID.
CreateSession( ):
  Creates a Session record in the database, and sets the SessionID property to the ID of that session.

DeleteSession( ):
  Deletes the current session from the schema-isolated system database.
MaintainComponentConfigs( ):
  This is a helper function to ensure that all the necessary ComponentConfig and SelectionCategoryConfig records exist in the database. If they do not, it creates them.

IpanParameters (540)

Container for IPanParameter objects.

Public Attributes

Count:
  Returns the number of objects in the container.

Public Operations

Add (pParameter: IPanParameter)
  Adds an IPanParameter object to the container.
Item (index: VARIANT): IPanParameterf
  Retrieves an IPanParameter object from the container. Objects can be referenced either by index or by name.

IpanQueryTemplate (520)

An IPanQueryTemplate is what manages communication between a component and the database. The query template is responsible for retrieving the appropriate SQL string from the database, setting up the appropriate parameters, and executing the SQL string to obtain a recordset.

Public Attributes

Name: BSTR
  The name of the query template.
GUID: BSTR
  A GUID in registry format, without the curly braces, that uniquely identifies a query template.
Description: BSTR
  A short description of the query template. Set by the component developer.
Command: ADODB.Command
  An ADODB Command object, which is used to execute the SQL string retrieved from the database. The SQL string itself can be obtained from the Command object, or it can be loaded explicitly without reference to the schema-isolated system database. This is useful when a query template is used without an associated IPanComponent object.
QueryID: long
  The ID of the query currently loaded from the schema-isolated system query table.
Fields: IPanFields
  A container to hold IPanField objects, which describe the fields that are returned when the query template is executed.
Parameters: IPanParameters
  A container which holds the parameter objects representing the parameters that the template must provide in order to execute the associated SQL command.
Optional: BOOL
  If true, the component does not require that a query be associated with this query template.
ChangesDatabase: BOOL
  True if executing the query template results in a change to the database.
ReturnsRecordset: BOOL
  If true, the template is expected to return a recordset containing at least the non-optional fields described by the Fields container.

Public Operations

Register (component: IPanComponent):
  Registers the query template in the database, or overwrites attributes of an existing query template record with the same GUID.
Prepare (component: IPanComponent):
  Loads the SQL command for this template from the database, with regard to the current component and form configuration.
Execute( ): :ADODB.Recordset
  Substitutes the current parameter values into the ADODB Command object, and executes the command, returning any resulting recordset.

IPanQueryTemplates (515)

A container for IPanQueryTemplate objects.

Public Attributes

Count: long
  The number of objects in the container.

Public Operations

Add (Item: IPanQueryTemplate):
  Adds an IPanQueryTemplate object to the container.
Item (index: VARIANT): IPanQueryTemplate
  Retrieves an IPanQueryTemplate object from the container. Objects may be indexed by position or by name.
Prepare (component: IPanComponent):
  Calls Prepare( ) on all query templates in the container.
Register (component: IPanComponent):
  Calls Register( ) on all query templates in the container.

IPanSelectionMaps

A container for IPanSelectionMap objects.

Public Attributes

Count: long
  The number of objects in the container.

Public Operations

Add (pSelectionMap: IPanSelectionMap):
  Adds an IPanSelectionMap object to the container.
Item (index: VARIANT): IPanSelectionMap
  Retrieves an IPanSelectionMap object from the container. Can be indexed by position or by name. (Objects are indexed by the CategoryName property.)
Prepare (component: IPanComponent):
  Loads selection category configuration information from the PanSelectionCategoryConfig table into each IPanSelectionMap object in the container.
Register (component: IPanComponent):
  Registers the selection category names of each IPanSelectionMap object in the container and associates them with the component.
UpdateFromDB( ):
  Updates the client-side selection state from the server-side selection state for all selection maps in the container.

PanComponentCore (510)

Derived from IPanComponent

Public Attributes

SelectionMaps: IPanSelectionMaps
The SelectionMaps container, which is private in IPanComponent.

Public Operations

AddField (templateName: BSTR, fieldName: BSTR, description: BSTR, type: long, optional: BOOL):
Helper function to create a new IPanField object in an associated query template.
AddParameter (templateName: BSTR, paramName: BSTR, description: BSTR, type: long, isInput: BOOL, isOutput: BOOL, optional: BOOL):
Helper function to create a new IPanParameter object in an associated query template.
AddSelectionCategory (categoryName: BSTR):
Helper function to create a new selection category for the component, and the associated IPanSelectionMap object.
AddTemplate (templateName: BSTR, guid: BSTR, description: BSTR, returnRecordset: BOOL, changesDatabase: BOOL, optional: BOOL):
Helper function to create a new query template object.
SetParameterValue (templateName: BSTR, parameterName: BSTR, value: VARIANT):
Helper function that sets the value of a parameter in an associated query template.
ExecuteTemplate (templateName: BSTR): ADODB.Recordset
Helper function that retrieves and executes the query template named by the templateName parameter.

Having now described various embodiments of the present invention, it should be apparent to those skilled in the relevant art that the foregoing is illustrative only and not limiting, having been presented by way of example only. Many other schemes for distributing functions among the various functional elements of the illustrated embodiment are possible in accordance with the present invention. The functions of any element may be carried out in various ways in alternative embodiments. Also, the functions of several elements may, in alternative embodiments, be carried out by fewer, or a single, element.

There are many possible variations of the architecture for the tables or data structures referred to above. It will be understood that the terms "table" and "data structure" are used broadly herein to include any known or future method or technique for storing information or otherwise making it available to be operated upon or used. Data in data structures may, in alternative embodiments, be saved in different combinations of data structures than those shown in the illustrative embodiment, or in a single data structure. In addition, it will be understood by those skilled in the relevant art that control and data flows between and among functional elements of the invention and various data structures may vary in many ways from the control and data flows described above. More particularly, intermediary functional elements (not shown) may direct control or data flows; the functions of various elements may be combined, divided, or otherwise rearranged to allow parallel processing or for other reasons; intermediate data structures may be used; various described data structures may be combined; the sequencing of functions or portions of functions generally may be altered; and so on. Numerous other embodiments, and modifications thereof, are contemplated as falling within the scope of the present invention as defined by appended claims and equivalents thereto.

What is claimed is:

1. A system for developing, modifying, or maintaining at least one client application that accesses data in at least one target database, comprising:
 a middleware-table inserter constructed and arranged to insert at least one middleware table into the target database, wherein the middleware table includes a set of compatibility data said compatibility data including information about the structure of said at least one client application and relating one or more client-application data requests with one or more corresponding target-database data formats or schema; and
 a data communication component constructed and arranged to receive a client-application data request from the client application, and, based on at least a first datum of the set of compatibility data, provide to the client application the one or more target-database data formats or schema corresponding to the client-application data request;
 wherein, the first compatibility datum relates the one or more client-application data requests with the one or more corresponding target-database data formats or schema based, at least in part, on said information about the structure of said client application.

2. The system of claim 1, wherein:
 the information about the structure of said at least one client application comprises a configuration or semantics criterion.

3. The system of claim 1, wherein:
 the information about the structure of said at least one client application comprises a component usage criterion.

4. The system of claim 1, wherein:
 the first compatibility datum comprises at least one SQL query.

5. The system of claim 1, wherein:
 the at least one target database comprises a relational database.

6. A system comprising:
 a table in a target database, said table including a set of compatibility data, said compatibility data comprising information about the structure of at least one client application and relating one or more client application data requests with one or more corresponding target-database data formats or schema; and
 a data communication component constructed and arranged to provide, based at least in part on a first datum of the set of compatibility data, at least one of the one or more target-database data formats or schema corresponding to a first of the one or more client-application data requests.

7. A system for developing, modifying, or maintaining at least one client application that accesses data in at least one target database, said database having a schema for organizing data in said database, said system comprising:
 at least one middleware table in said target database, wherein the middleware table includes information about the structure of said at least one client application accessing said database and a set of commands for binding said client application to said target database; and a data communication component constructed and arranged to receive a client-application data request from the client application, and, based on said information about the structure of said client application, provide to the client application at least one command from said set of commands corresponding to the client-application data request; whereby said client application accesses data from said target database.

8. The system of claim 7 wherein said middleware tables have no explicit references to or from other tables in said target database, whereby client application is isolated from said schema of said target database.

9. The system of claim 7 wherein said middleware table further comprises client state information to coordinate components of client applications.

10. The system of claim 9 wherein said client state information comprises session information distinguishing components of said at least one client application from components of other applications or from components of other copies of said at least one application.

11. The system of claim 9 wherein said client state information comprises a selection state identifying an object in said target database.

12. The system of claim 11 wherein said at least one client application further comprises a plurality of components, at least one component submitting a client-application data request including a change of selection state, and wherein said client application determines what other components in said client application are affected by said change of selection state.

13. The system of claim 7 wherein said information about the structure of said at least one client application accessing said database comprises at least a query template defining data that said client application provides to the target database and data which said client application requests from said target database.

14. The system of claim 13 wherein said at least one command comprises a query accepting parameters from said query template and mapping data from said target database into fields in said query template.

15. A method for developing, modifying, or maintaining at least one client application that accesses data in at least one target database, comprising the steps of inserting at least one middleware table into the target database, wherein the middleware table includes a set of compatibility data relating one or more client-application data requests with one or more corresponding target-database data formats or schema;

receiving a client-application data request from the client application; and, based on at least a first datum of the set of compatibility data, providing to the client application the one or more target-database data formats or schema corresponding to the client application data request;

wherein, the first compatibility datum relates the one or more client-application data requests with the one or more corresponding target-database data formats or schema based, at least in part, on a syntax criterion, a configuration or semantics criterion, and a component usage criterion.

16. The method of claim 15, wherein:
the first compatibility datum comprises at least one SQL query.

17. The method of claim 16, wherein:
the at least one target database comprises a relational database.

18. A method comprising the steps of:
providing in a database a table including a set of compatibility data including information about the structure of at least one client application and relating one or more client-application data requests with one or more corresponding target-database data formats or schema; and providing, based at least in part on a first datum of the set of compatibility data, at least one of the one or more target-database data formals or schema corresponding to a first of the one or more client-application data requests.

19. A computer program product for developing, modifying, or maintaining at least one client application that accesses data in at least one target database, that, when executed on a computer, performs a method comprising the steps of:

inserting at least one middleware table into the target database wherein the middleware table includes a set of compatibility data relating one or more client-application data requests with one or more corresponding target-database data formats or schema;

receiving a client-application data request from the client application; and, based on at least a first datum of the set of compatibility data, providing to the client application the one or more target-database data formats or schema corresponding to the client application data request;

wherein, the first compatibility datum relates the one or more client-application data requests with the one or more corresponding target-database data car abilities based, at least in part, on a syntax criterion, a configuration or semantics criterion, and a component usage criterion.

20. The product of claim 19, wherein:
the first compatibility datum comprises at least one SQL query.

21. The product of claim 20, wherein:
the at least one target database comprises a relational database.

* * * * *